US010196203B2

(12) United States Patent
Standke et al.

(10) Patent No.: US 10,196,203 B2
(45) Date of Patent: Feb. 5, 2019

(54) WASTE SEPARATION SYSTEM

(71) Applicants: Timothy Standke, Ann Harbor, MI (US); Robert Silveria, Fallbrook, CA (US)

(72) Inventors: Timothy Standke, Ann Harbor, MI (US); Robert Silveria, Fallbrook, CA (US)

(*) Notice: Subject to any disclaimer, the term of this patent is extended or adjusted under 35 U.S.C. 154(b) by 369 days.

(21) Appl. No.: 15/217,663

(22) Filed: Jul. 22, 2016

(65) Prior Publication Data

US 2018/0022542 A1   Jan. 25, 2018

(51) Int. Cl.
*B65F 1/08* (2006.01)
*B01D 29/11* (2006.01)
*B01D 29/13* (2006.01)
*B65F 1/10* (2006.01)

(52) U.S. Cl.
CPC .............. *B65F 1/08* (2013.01); *B01D 29/111* (2013.01); *B01D 29/13* (2013.01); *B65F 1/10* (2013.01); *B01D 2201/0415* (2013.01); *B65F 2210/132* (2013.01)

(58) Field of Classification Search
CPC .......... B01D 2201/0415; B01D 29/111; B01D 29/13; B65F 1/08; B65F 1/10; B65F 2210/132
See application file for complete search history.

(56) References Cited

U.S. PATENT DOCUMENTS

| | | | |
|---|---|---|---|
| 3,939,765 A | 2/1976 | Jung | |
| 3,948,163 A | 4/1976 | Ligh | |
| 4,680,808 A | 7/1987 | Paleshuck | |
| 5,030,360 A | 7/1991 | Grainger | |
| 5,630,362 A | 5/1997 | Jonsson | |
| 6,067,900 A | 5/2000 | Lackner | |
| 7,011,017 B2 | 3/2006 | Satou | |
| 7,500,430 B2 | 3/2009 | Claflin | |
| 7,954,426 B2 | 6/2011 | Murphy | |
| 8,640,613 B1 | 2/2014 | Fleming | |
| 8,919,246 B2 | 12/2014 | Salda | |
| 9,003,967 B2 | 4/2015 | Reed | |
| 9,346,231 B1 | 5/2016 | Abner | |
| 9,399,552 B1 | 7/2016 | Abner | |
| 2013/0042919 A1* | 2/2013 | Lambke | F17D 3/00 137/1 |

* cited by examiner

*Primary Examiner* — Dirk R Bass
(74) *Attorney, Agent, or Firm* — Tobin Hobbs

(57) ABSTRACT

Disclosed is a system for separating liquid and solid waste. The system provides a plurality of ways of moving liquids from initial disposal to a reservoir. The system may comprise an insert and a shell, or may include a funnel, insert and shell. The funnel allows for direct collection of liquids. The insert allows for indirect collection of liquids.

19 Claims, 15 Drawing Sheets

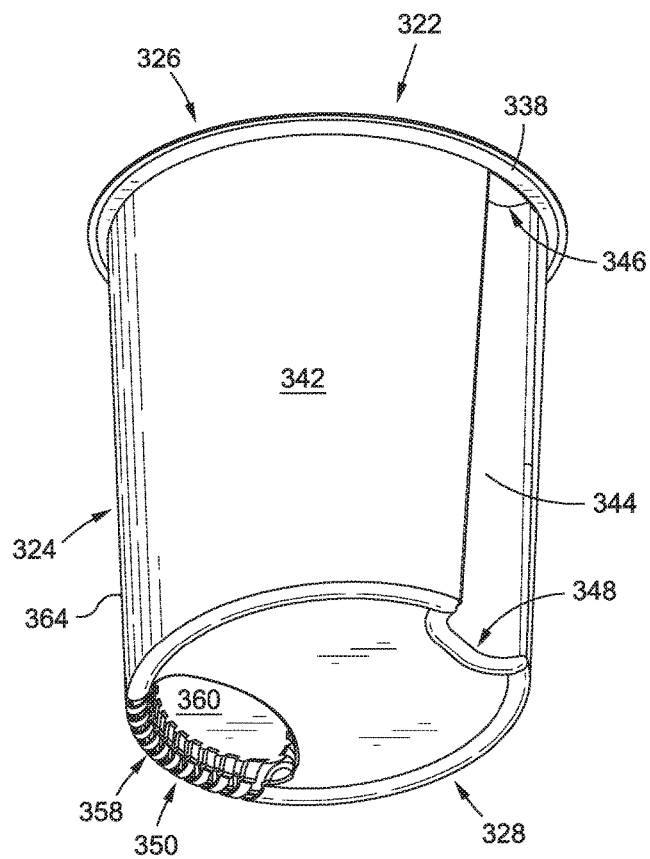
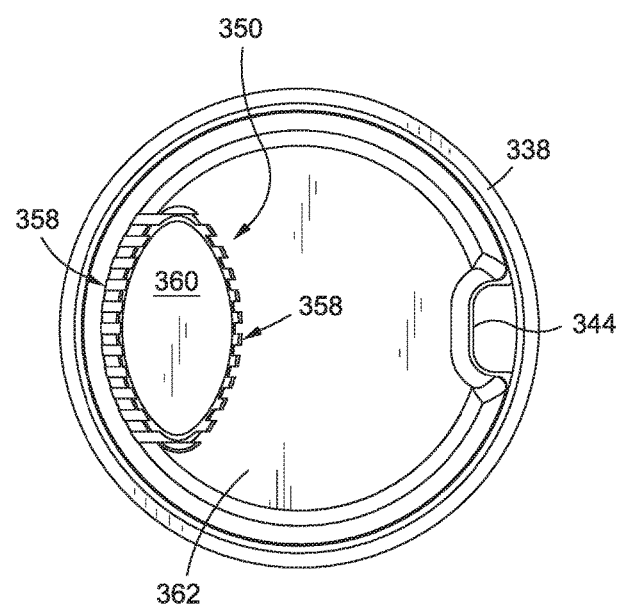

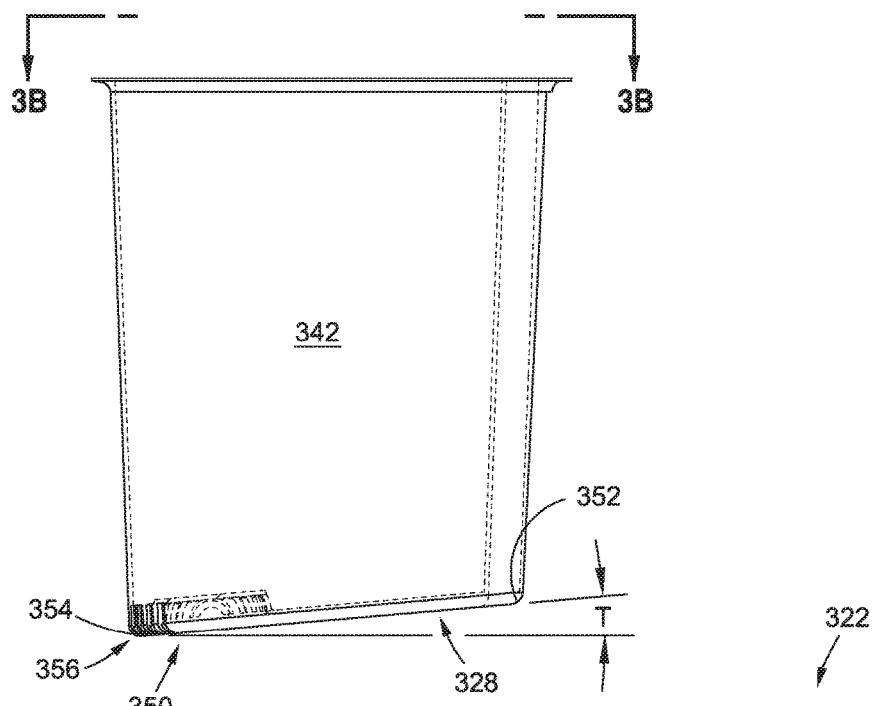
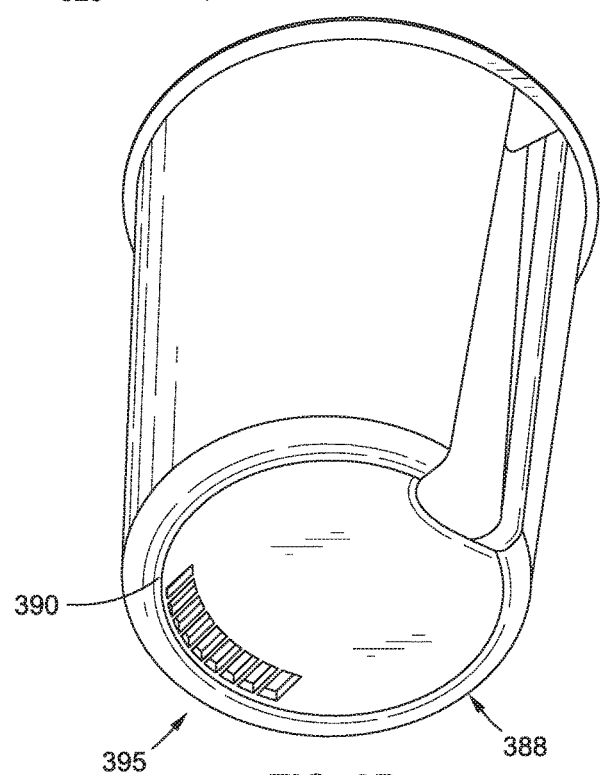

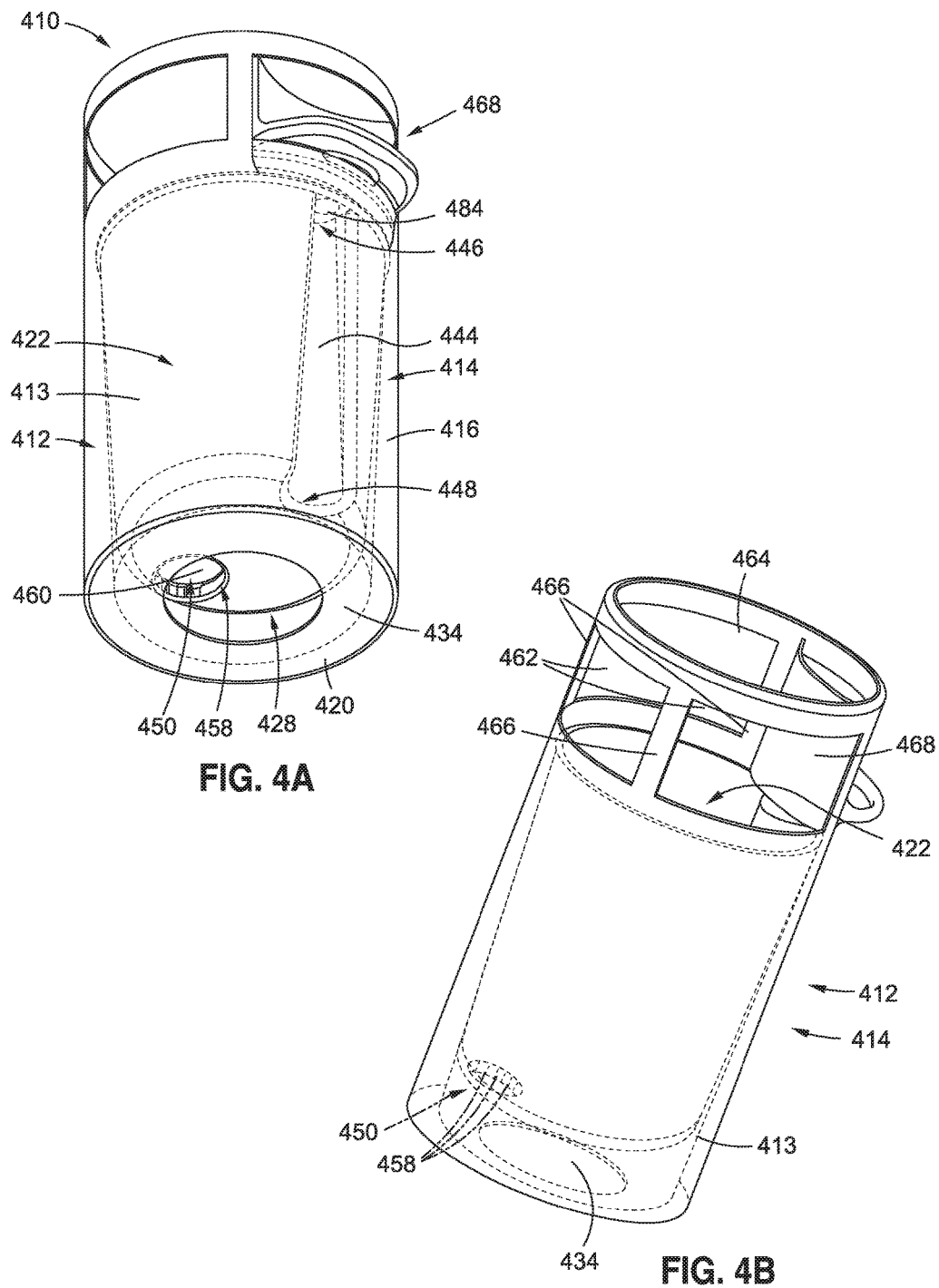

WASTE SEPARATION SYSTEM

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Field

The present invention concerns a system to permit separation of liquid and solid refuse in a single receptacle to facilitate the disposal of such mixed items, as well as offer the best opportunity for recycling. The overall system includes a trash receptacle device for deposit and separation of liquid and solid refuse including a reservoir for separated liquids as well as an easy-to-use and -operate liquid removal component with appropriately located openings that allow for fluid transfer via gravitational forces and yet still retains suitable dimensional stability to collect and retain substantially all deposited solid refuse during further transport. Alternatively, the system includes as well an integrated chute to allow for a user to pour liquids directly into the reservoir at the mouth opening of the receptacle to bypass introduction of large amounts of fluids into the solid waste collection area. Such a new system is particularly useful in settings with a large number a patrons wherein quick cleanup of patrons' refuse is necessary without the requirement for inefficient separation of liquid and solid items by hand. Such a viable, reliable and effective liquid/solid separation system as well as the method of use of such a device is encompassed within the instant invention.

2. Background

Where a large number of patrons are present, particularly where the patrons consume both food and drink, disposable refuse generally includes solid components (napkins, plastic cups, plastic utensils, paper plates, and the like) and liquids (water, alcohol, soda, and the like), as well as foodstuffs. Even if the plates and glasses are separated for subsequent cleaning, such liquids are sometimes poured into a trash bin rather than down a sink (in some locations, alcohol is avoided from sinks for various reasons, as one example). In any event, typical situations for such establishments include the collection of both solid and liquid refuse into single trash bins, if not collection bags, for further transfer into a larger collection device (i.e., a dumpster).

These situations involve the generation of appreciable amounts of both solid and liquid refuse within a single trash bin, and, more pointedly, within the same trash collection system, thus requiring care in transfer to a larger refuse receptacle (again, a dumpster, as one example).

Thus, there is a definitive need to provide large public venues, as well as others, with the capability to easily provide solid and liquid refuse separation without having the user do so by hand and in a manner that is efficient, safe, and reliable. The prior art primarily discloses methods of providing different trash bins with liquid collection components that may be easily accessible for the liquid to be removed. Otherwise, the only other discussion of liquid and solid separation is with regard to paper bags that are subjected to loss of dimensional stability upon the presence of sufficient liquid therein and thus require specific trash bin structures with components upon which such bags must be placed for bag resiliency to remain in effect when in use. There is nothing provided, however, within the prior art that discloses or suggests the utilization of a properly configured system with suitable opening and reservoir integrated therein for liquid removal through gravitational forces alone and that retains the necessary dimensional stability and strength to permit collection of solid trash, removal of the insert from the shell, and transfer of the entirety of the refuse to a different receptacle. The prior art, as well, lacks any teaching to a receptacle configuration that includes an integrated chute present therein that allows for multiple paths of liquid waste to a collection reservoir. The present invention thus overcomes these deficiencies.

BRIEF SUMMARY

Disclosed is a method of forming a system for separation of solid and liquid waste. The method includes forming a shell which includes a cylindrical wall, an open end, and closed end, and placing an insert removably and at least partially within the shell. The insert includes a body, a first open end on one end of the insert, a liquid pathway extending from the first open end of the insert to an opposite, partially closed end of the insert, and a flange extending at least partially around a perimeter of the open end, at least a portion of the flange having an outer diameter greater than an outer diameter of the shell. The method further includes forming a funnel comprising at least one drain opening which directs fluids in to the liquid pathway. The partially closed end of the insert comprises a portion permeable to liquid to which a flow of liquid is directed by a remainder of the partially closed end and the cylindrical wall.

Further disclosed is a system for separation of solid and liquid waste. The system includes a shell comprising a body, an open end, and closed end, an insert removably placed at least partially within the shell. The insert includes a body, an open end, a longitudinal groove extending between the open end of the insert and an opposite, partially closed end of the insert, and a flange extending at least partially around a perimeter of the open end. At least a portion of the flange has an outer diameter greater than an outer diameter of the shell. Finally, the system includes a funnel comprising a bottom portion, the bottom portion comprising a drain opening, the drain opening directing fluids in to the longitudinal groove.

Further disclosed is a system for separation of solid and liquid waste, including a shell comprising a body, an open end, and closed end, an insert removably placed at least partially within the shell, the insert comprising a body, an open end, a longitudinal groove extending from the open end of the insert to an opposite, partially open end of the insert, and a flange extending at least partially around a perimeter of the open end, at least part of the flange having an outer diameter greater than an outer diameter of the shell. The insert also includes a convex bottom portion, and a portion permeable to liquid comprising at least one opening around the perimeter of the convex bottom portion, the at least one opening directing fluids in to a liquid capture reservoir. Finally, the system includes a funnel comprising a drain opening directing fluids in to the liquid capture reservoir.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 3A shows a perspective view of an insert of an alternate embodiment of the system;

FIG. 3B shows a top view of the insert of FIG. 3A;

FIG. 3C shows a side view of the insert of FIG. 3A;

FIG. 3D shows a perspective view of an alternative embodiment of the insert;

FIG. 4A shows a perspective view of an alternate embodiment of the system;

FIG. 4B shows an alternate perspective view of the embodiment of FIG. 4A;

DETAILED DESCRIPTION

The detailed description set forth below in connection with the appended drawings is intended as a description of the presently preferred embodiment of a system for separating liquid and solid wastes, and is not intended to represent the only form in which it can be developed or utilized. The description sets forth the functions for developing and operating the system in connection with the illustrated embodiments. It is to be understood, however, that the same or equivalent functions may be accomplished by different embodiments that are also intended to be encompassed within the scope of the present disclosure. It is further understood that the use of relational terms such as first, second, distal, proximal, and the like are used solely to distinguish one from another entity without necessarily requiring or implying any actual such relationship or order between such entities.

Figure 1:
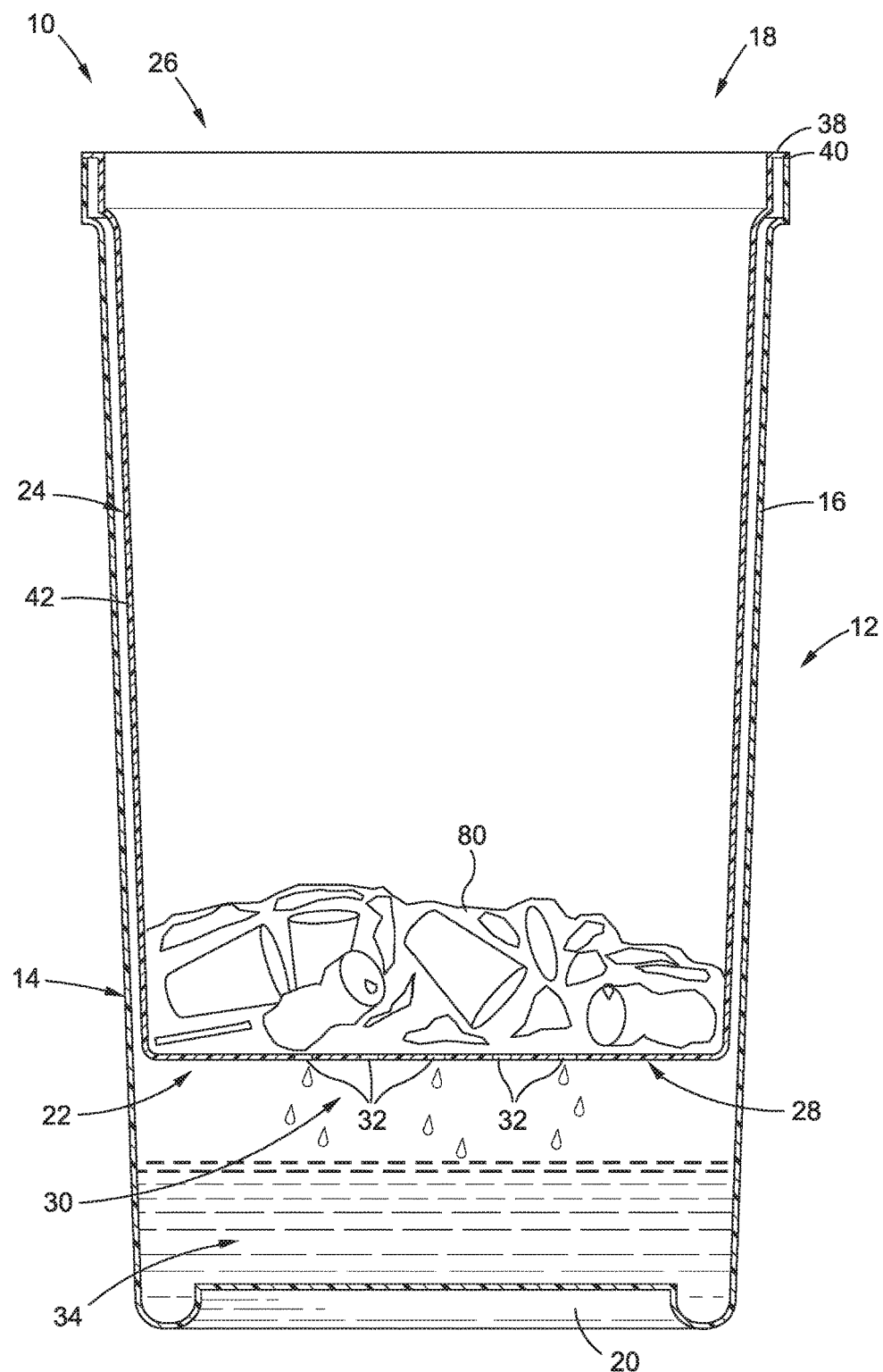
FIG. 1 shows a cross sectional view of an exemplary embodiment of the system.

Referring to FIG. 1, an exemplary embodiment of the disclosure is shown. This embodiment includes a system 10 of two components. The first component is a shell 12. The shell includes a body 14 defined by a cylindrical wall 16, a shell open end 18, and a shell closed end 20. As shown, the shell is made of a semi rigid material. The material of the cylindrical wall may be, for example, a plastic, a composite, such as fiberglass, or a metal, such as aluminum. In other embodiments, the shell may be made of a non-rigid material, such as materials typically used to make garbage cans for household or commercial use. In still other embodiments, the shell may be of a rigid material, such as steel or other alloys. In this embodiment, the semi-rigid cylindrical wall holds a cylindrical shape. In other embodiments, as seen along a longitudinal axis, the cross section of the shell may be of another shape, for example, the shell may have a square or rectangular cross section, or a triangular cross section, or any other polygonal or irregular shape desired for functional or aesthetic reasons.

The second component is an insert 22, which includes a body 24 defined by a cylindrical wall 42, an open end 26, and a partially closed end 28, the partially closed end including a portion permeable to liquid 30. As shown in FIG. 1, the portion permeable to liquid 30 is defined by a plurality of holes 32 in the partially closed end of the insert. In other embodiments, the portion permeable to liquid may be a different material from the remainder of the insert, such as a gauze material, or a sponge, or a filter material, which prevents the passage of solids, but is permeable to liquids. Moreover, the portion permeable to liquid may be located on the partially closed end, as in this embodiment, or may be on a portion of the body, which is defined by a cylindrical wall in the embodiment of FIG. 1, adjoining the partially closed end, or both a portion of the body and the partially closed end.

Figure 2:
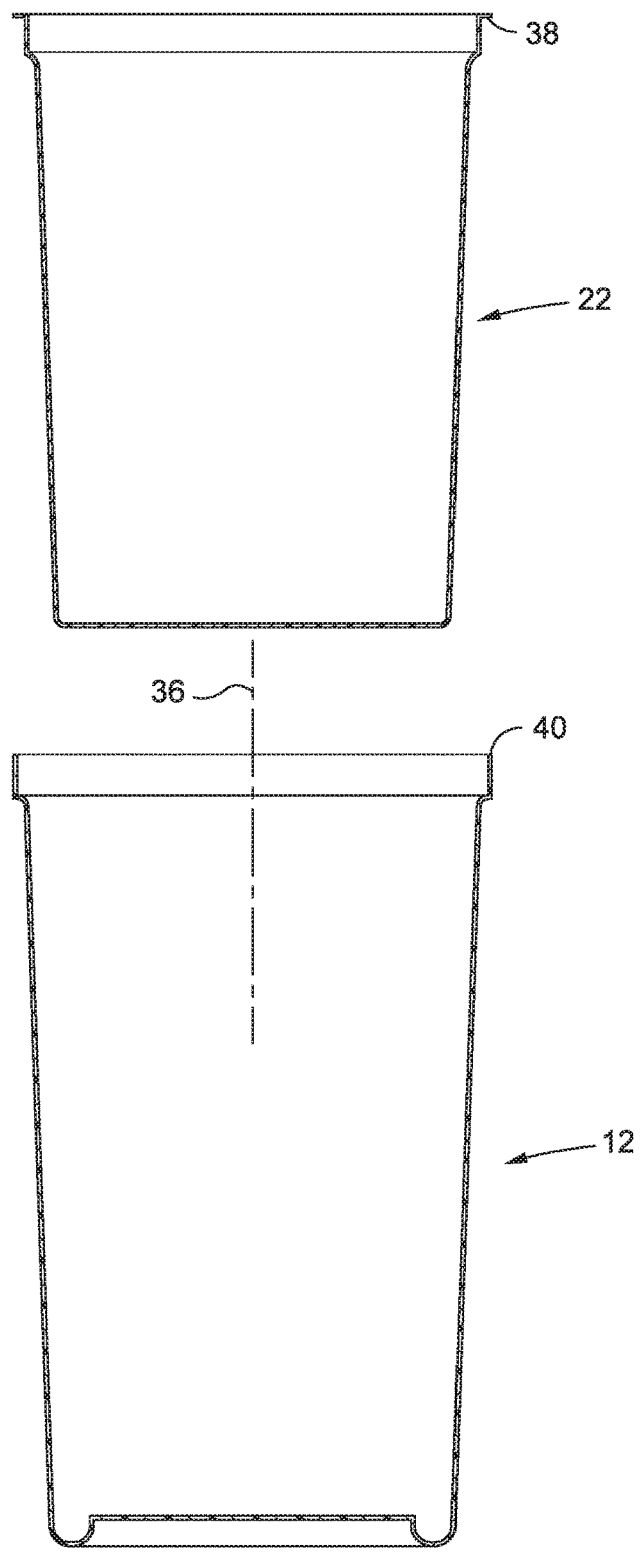
FIG. 2 shows a cross sectional view of the embodiment of FIG. 1 with the insert and shell separated.

With reference to both FIGS. 1 and 2, the portion permeable to liquid 30 allows liquid placed in the insert 22 to pass through into a liquid capture reservoir 34. The liquid capture reservoir is defined by the space between the partially closed end 28 of the insert and the closed end 20 of the insert 12. The insert is shorter along a longitudinal axis 36 than the shell. The difference in length between the insert and the shell coupled with the substantial alignment of the open end 18 of the insert and the open end 26 of the shell, which occurs due to the engagement between a flange 38 of the insert and a face 40 of the cylindrical wall 16 defining the open end 18 of the shell, assures that there is a gap between the partially closed end of the insert and closed end of the shell, the gap defining the liquid capture reservoir, may vary. The difference in length may be adjusted based on differences in anticipated or observed loads of solid and liquid waste. A shorter insert may be chosen for greater liquid loads, and a longer insert for greater solid loads.

The insert 22 is sized such that an outer diameter of the insert is less than an inner diameter of the shell 12. The insert is designed to interface with the shell. As described above, the interface may be as simple as forming a flange 38 on an open end 26 of the insert. The flange has a greater outside diameter than an inside diameter of the shell 12, and thus rests on the face 40 of the open end 18 of the shell. In other embodiments, the interface between the insert and the shell may have additional elements which serve to connect the insert to the shell. The insert may be made of the same material as the shell, or a different material. The material of the insert is unaffected by the presence of liquid, and a semi-rigid plastic is most preferred, but other materials that do not rust or corrode with prolonged exposure to liquid are contemplated. Materials that are coated or plated so that they are unaffected by liquid are also contemplated.

Shown in FIG. 3A is a second embodiment of the insert 322. In this embodiment, the insert includes a body 324 defined by a cylindrical wall 342. The insert further includes an open end 326, and a partially closed end 328. Similar to the embodiment of FIGS. 1 and 2, the insert includes a flange 338 which suspends the insert within the shell (not shown).

In the embodiment of FIG. 3A, the cylindrical wall 342 of the insert 322 is shaped to include a longitudinal groove 344. On one end 346, the longitudinal groove opens to the inside of the flange, and on an opposite end 348 the longitudinal groove opens to a liquid capture reservoir (not shown) similar to that of FIG. 1, defining a liquid pathway. As shown in FIG. 3B, the flange 338 does not impinge on the end of the longitudinal groove 344 corresponding to the open end of the insert. In another embodiment of the insert, the flange does not have to create a bridge across the top end of the grove as depicted in FIG. 3A.

Turning to both FIGS. 3A and 3B, the insert 322 further includes a portion permeable to liquid 350 formed on the partially closed end 328. The partially closed end is at a taper "T." In the embodiments where the insert body is cylindrical, as is shown in FIG. 3C, the partially closed end tapers from a first point 352 opposite the portion permeable to liquid 350, the first point defining the shortest portion of the cylindrical wall 342 to a second point 354 corresponding to an outside 356 of the portion permeable to liquid, which defines the longest portion of the cylindrical wall. In alternative embodiments, the location of the shortest portion of the cylindrical wall is independent of the location of the groove in the cylindrical wall. Therefore, the portion of the partially closed end of the insert permeable to liquids may be located at any position on the partially open end of the insert, which includes the location of the groove. As shown in FIG. 3D, in alternative embodiments, the insert 322 may have a concave partially closed end 388, which causes liquid to move to a perimeter 390 of the partially closed end, and flow out a portion permeable to liquid 395 on the perimeter of the partially closed end. In other embodiments where the insert includes a partially closed end with a multi-sided polygonal cross section with an even number of sides, the partially closed end tapers from one side of the polygonal cross section to an opposing side. In still other embodiments where the insert includes a partially closed end with a multi-sided polygonal cross section with an odd number of sides, the partially closed end may taper from a point where two sides meet to an opposing side of the polygon, or from a side of the polygon to a point where two of the sides of the polygon meet. In still other embodiments, the taper may be from outside edges of the polygon toward a center of the polygon. In still other embodiments, the partially closed end may taper to an offset point where the portion permeable to liquid is placed on the partially closed end.

In the embodiment shown in FIGS. 3A and 3B, the low portion includes a plurality of vertical slots 358 arranged around the perimeter of a raised panel 360 extending in to an interior 362 of the insert 322 defined by the cylindrical wall 342. At least one of the plurality of vertical slots extends through an outer surface 364 of the cylindrical wall, as well as opening to the interior of the insert. In the embodiment shown in FIGS. 3A and 3B, approximately half of the vertical slots extend through the outer surface of the cylindrical wall. In other embodiments, the vertical slots may be apportioned differently to achieve a desired flow pattern.

Figure 4C:
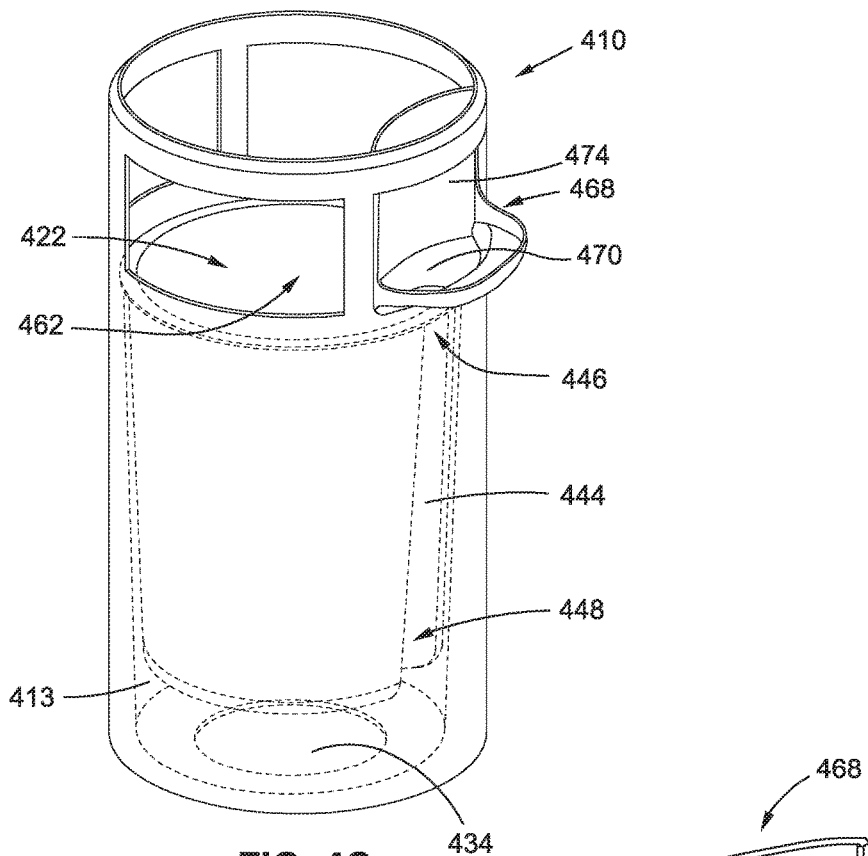
FIG. 4C shows another alternate perspective view of the embodiment of FIG. 4A.

FIGS. 4A, 4B and 4C show another exemplary embodiment of the system 410, including a bin 412, a shell 413, including a body 414 defined by a cylindrical wall 416. The shell further includes a closed end 420. The system further includes an insert 422 including a longitudinal groove 444 similar to the insert 322 of FIGS. 3A and 3B, a partially closed end 428, and a portion permeable to liquid 450 in the partially closed end. In FIG. 4A, the bin and the cylindrical wall of the shell and the closed end of the shell are cut away to reveal the insert. Due to the cutaway portions of the bin and shell, the longitudinal groove of the insert and the portion permeable to liquid, which, in this embodiment, includes a raised panel 460 and vertical slits 458 allowing liquid to pass through to a liquid capture reservoir 434, are visible.

In operation, liquid may enter the system in one of two locations, and from either of those locations, take separate paths to the liquid capture reservoir 434. As can best be seen in FIGS. 4A, 4B, and 4C, liquid may enter the system 410 through any one of a plurality of openings 462 defined by an open space between a top 464, legs 466 which support the top, and the body 414 of the bin 412. Liquid may also enter the system via a funnel 468. For example, a user may throw a partially filled cup (not shown) in to the system through one of the plurality of openings. If there is any solid waste 80 (FIG. 1) already present in the insert 422, the liquid will flow around the solid waste, and, under the force of gravity move down to the partially closed end 428. Once the liquid reaches the partially closed end, a taper of the partially closed end causes liquid to flow toward the portion permeable to liquid 450. Once liquid arrives at the portion permeable to liquid, the liquid then moves through the vertical slots 458 of the portion permeable to liquid and enters a liquid capture reservoir 434 similar to that of the embodiment of FIG. 1.

Figure 4D:
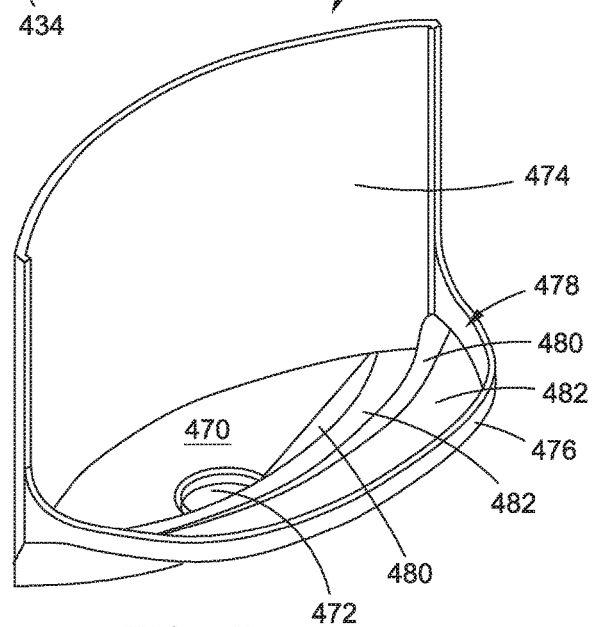
FIG. 4D shows a detail view of the funnel of the embodiment of FIGS. 4A-4C.

Alternately, liquid may also be placed in a funnel 468, which is shown in FIGS. 4A, 4B, 4C, and in detail in FIG. 4D. The funnel includes an elliptical paraboloid bottom portion 470, the elliptical paraboloid bottom portion including a drain opening 472 at a lowest point of the elliptical paraboloid bottom portion, the drain opening directing fluids in to a first end 446 of the longitudinal groove 444 which opens to an open end 462 of the insert 422. The funnel further includes a wall 474 distal of a user, which is laterally arcuate. That is, the wall curves in correspondence to a perimeter of the elliptical paraboloid shape of the elliptical paraboloid bottom portion. The funnel further includes a vertical flange 476 proximal to a user (not shown). Interior to the flange, the funnel may further include at least one tiered portion 478 located between the elliptical paraboloid bottom portion and the vertical flange. In the embodiment of FIG. 4B, there are two tiered portions. Each tiered portion includes two arcuate surfaces, a first arcuate surface 480 sloping toward the drain opening at greater than 45 degrees, and a second arcuate surface 482 sloping toward the opening at less than 30 but more than zero degrees. In other embodiments, the funnel may have a single sloping surface from the lip to the drain. In still other embodiments, there may be only one tiered surface. Still other embodiments may only include the elliptical paraboloid bottom portion, and a rear laterally arcuate wall, and a corresponding front arcuate wall. The drain opening in the funnel aligns with an opening 484 of the longitudinal groove 444 corresponding to the open end of the insert. In this way, liquid passing through the drain opening enters the longitudinal groove. The liquid flows through the longitudinal groove and out an end 448 of the longitudinal groove corresponding to the partially closed end 428 of the insert, and in to the liquid capture reservoir 434, the longitudinal groove thus defining a liquid pathway.

As is shown in FIG. 4A, in some embodiments, the funnel 468 may interface with the insert 422 simply by resting on the opening defined by the longitudinal groove and an inside edge of the flange of the insert. In another embodiment the funnel may rest on top of the insert or the shell. As shown in FIG. 4A, the funnel is aligned with the longitudinal groove of the insert, but is supported by the bin, and held in place by arms formed in two of the opening legs of the bin. The laterally arcuate wall of the funnel is engaged on either end by the arms, preventing rotation and lateral movement of the funnel. The top of the laterally arcuate wall abuts the top of the bin, which helps prevent rotation and vertical movement. At least at a perimeter around the drain opening, the funnel abuts the longitudinal groove and an inside edge of the flange of the insert. The abutting of the funnel and the insert also helps prevent vertical movement and rotation of the funnel.

In other embodiments, the insert may have a wall corresponding to the opening of the longitudinal groove, but set back from an edge defining the groove opening. When the funnel is placed on the insert, the funnel abuts this wall, aligning the drain opening with the longitudinal groove. The arcuate wall of the insert helps properly align the funnel to the insert when the two are assembled.

In still other embodiments, a structure more closely forming to the underside of the elliptical paraboloid bottom portion may be formed in the insert. The funnel is placed in this structure from above, and the structure cradles the funnel. Again, much like the arcuate wall of the insert, the structure which conforms to the underside of the elliptical paraboloid bottom portion helps properly align the funnel to the insert when the two are assembled.

In still other embodiments, the funnel and the insert may mechanically engage one another. For example, the distal portion of the funnel may have one or more of downward facing "L" structures which overlap the arcuate wall of the insert. As the insert or the funnel is placed in the system, the "L" structures are bent inward toward the funnel until an end of the "L" clears the top of the arcuate wall of the insert. Once the "L" shaped structure is clear, it swings outwardly from the funnel, and comes to rest in its original configuration, such that it overlaps the arcuate wall of the insert, providing some resistance to separation of the two parts. When the insert and funnel are pulled apart, the "L" structure bends outwardly until the end clears the arcuate wall of the insert. The "L" shape structure clears the wall, and returns to its original configuration.

Figure 5A:
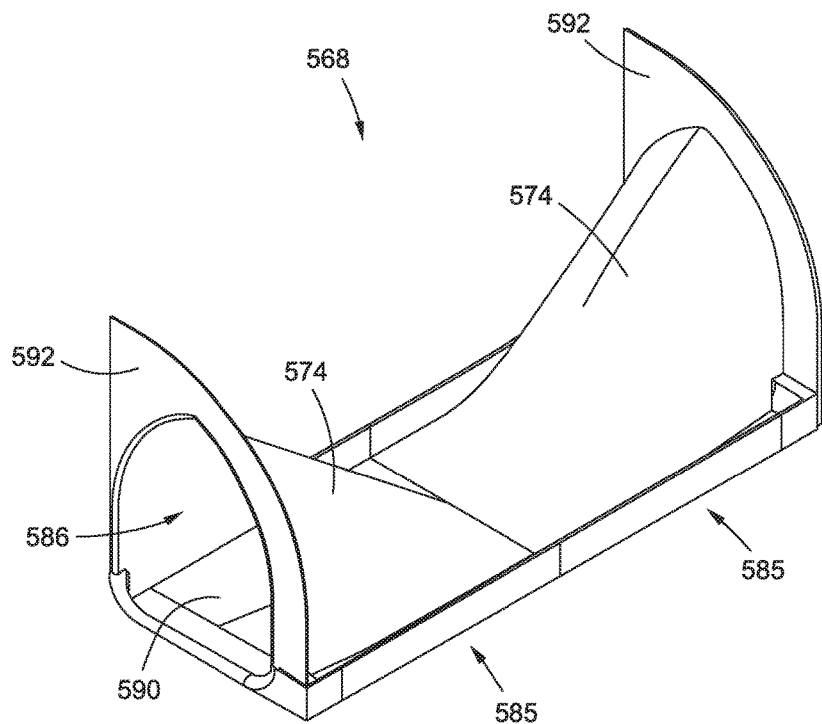
FIG. 5A shows a perspective view of an alternate embodiment of a funnel of the system.
Figure 5B:
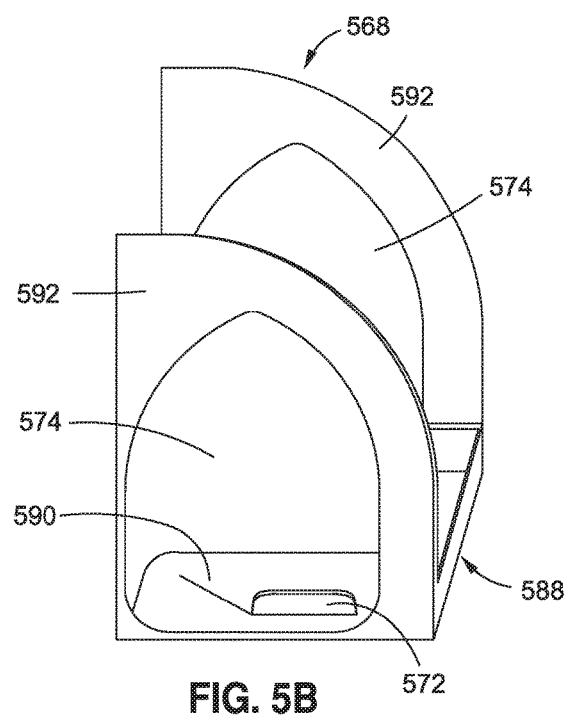
FIG. 5B shows an alternate perspective view of the embodiment of FIG. 5A.

FIGS. 5A and 5B shows an alternate embodiment of the funnel 568. This embodiment is most useful in combination with a bin, a shell, and an insert with a multi-sided polygonal cross section along the longitudinal axis. Specifically, the embodiment of FIG. 5 would work particularly well with a square or rectangular cross section bin (not shown) and insert (not shown). However, one of ordinary skill in the art will surely appreciate that an angle between the two halves 585 of the funnel can be changed to accommodate other multi-sided polygonal cross sections. The embodiment of FIGS. 5A and 5B has two halves 585. Each half has a clamshell upper portion 574, with a proximal open end 586. A lower portion 588 includes a planar surface 590 which slopes to a common drain opening 572 in the middle of the planar surface. The drain opening corresponds to the opening of one end of a longitudinal groove, such as that of FIG. 4A. With this structure, liquid placed in either side of the funnel will enter the longitudinal groove. The liquid flows through the longitudinal groove, exiting an opposite end of the groove and entering a liquid capture reservoir between the insert and the shell, the longitudinal groove thus defining a liquid pathway. The proximal open end of the clamshell may have various flanges attached in order to interface with the bin, in order to provide the desired design appearance, and to prevent any liquid spillage in to a portion of the system where the liquid cannot be directed to the liquid capture reservoir. The lower portion of the funnel can be used independently of the upper portion of the funnel and may protrude proximal to the user in order to improve accessibility.

Flanges 592 on either end are designed to interface with the shell (not shown) in order to prevent gaps between the funnel and the bin through which liquid may pass.

Figure 6A:
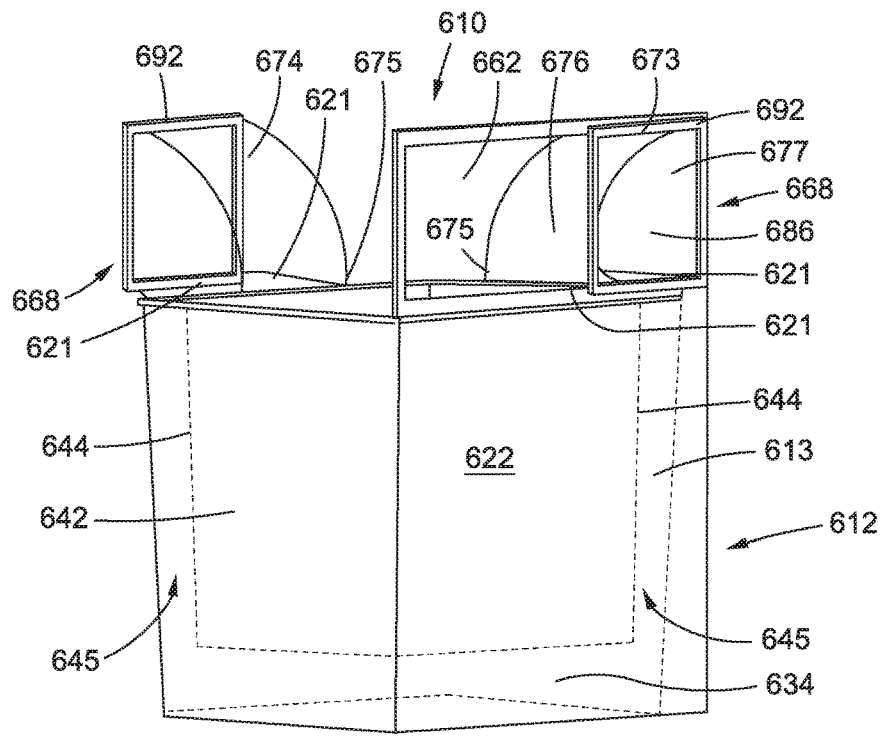
FIG. 6A shows a perspective view of another alternate embodiment of the system.
Figure 6B:
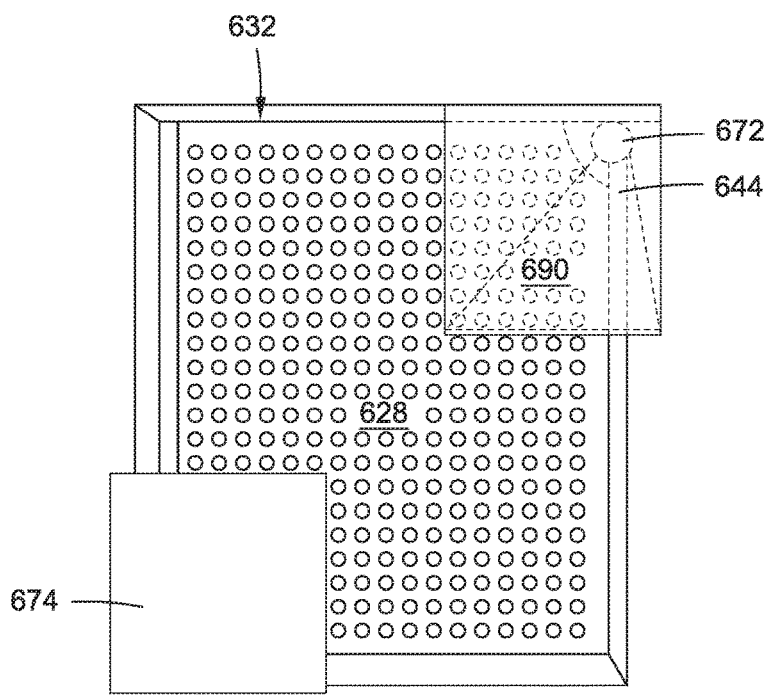
FIG. 6B shows a top view of the embodiment of the system of FIG. 6A.

FIGS. 6A and 6B show another alternative embodiment of the system 610. A bin 612 has openings 662 on at least two sides of the multi-sided polygonal cross section bin, both of the openings allowing space for solid and liquid waste to enter the system, but also to act as a mounting frame for a plurality of funnels 668. As shown, similar to the embodiment of FIGS. 1 and 2, the insert 622 includes a portion permeable to liquid 650 defined by holes 632 in the partially closed end 628 of the insert for allowing liquid to drain in to a liquid capture reservoir 634. In other embodiments, the portion permeable to liquid may be a different material from the remainder of the insert, such as a gauze material, or a sponge, or a filter material, which prevents the passage of solids, but is permeable to liquids. Moreover, the portion permeable to liquid may be located on the partially closed end, as in this embodiment, or may be on a portion of a wall 642 in the embodiment of FIG. 6, adjoining the partially closed end, or both a portion of the cylindrical wall and the partially closed end.

The insert 622 in the embodiment of FIGS. 6A and 6B has an insert longitudinal cross section in the shape of a multi-sided polygon, specifically, in this case, a square. In other embodiments, the longitudinal cross section may be any multi-sided polygon, including an irregular polygon. Two corners 644 of the square, opposing across a diagonal of the longitudinal cross section, have been truncated to form a space 645 between the insert and the shell 613 for liquid passing through a drain opening 672 of the funnel 668, the space thus defining a liquid pathway. In other embodiments, all four corners may be truncated regardless of the presence of a corresponding funnel. The shapes of the truncated corners be any polygonal or arcuate shape.

In this embodiment, a plurality of funnels 668 are placed, one in each opening 662 of the bin 613. The bin may have two or more openings, up to a number of openings corresponding to the number of sides of the bin. In other embodiments, the funnels may be placed directly across from one another on sides of the longitudinal cross section.

The funnel 668 includes a funnel opening 686 proximal to a user (not shown), a flange 692 surrounds the funnel opening to interface with a corresponding opening 662 on the bin 612, and an arcuate wall 674 which connects a top edge 673 of the funnel opening to a back edge 675 of a drain surface 690. The flange attaches or abuts the opening of the bin, and the flange has a greater outside dimension than an inside dimension of the opening of the bin. This prevents the funnel from falling in to the insert 622, or the bin 613.

Figure 6C:
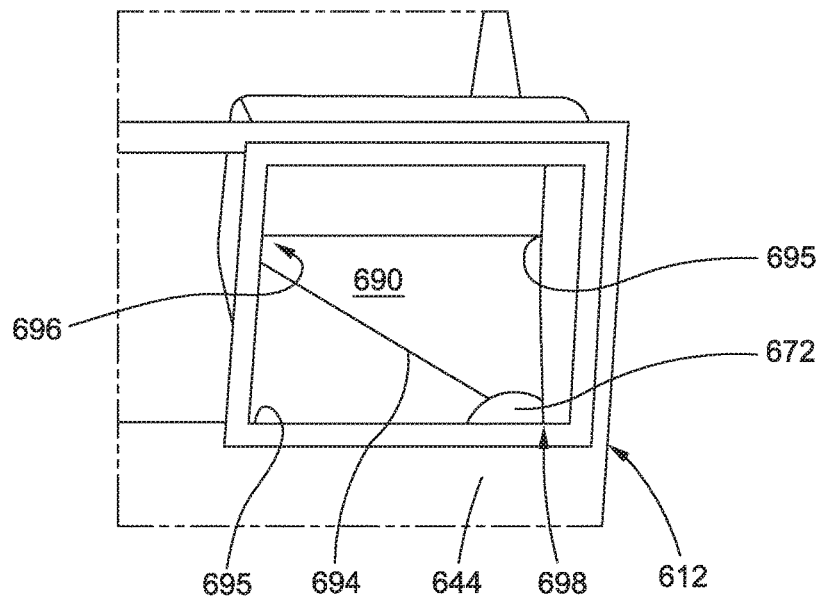
FIG. 6C shows a detail view of the funnel of the system of FIG. 6A.

As can best be seen in FIG. 6C, the drain surface 690 slopes along and to a diagonal 694 from two different directions. That is, the drain surface slopes down from corners 695 opposing across the diagonal to the diagonal, and from a distal end 696 of the diagonal to a proximal end 698 of the diagonal. This configuration directs liquid to a corner proximal of a user (not shown). A drain opening 672 is formed across the diagonal in the corner proximal of the user. In this embodiment the drain opening is circular. In other embodiments, the drain opening may be of any shape that drains fluid quickly and directs the fluid into the space created by the truncated corner 644 and the shell 613.

Figure 6D:
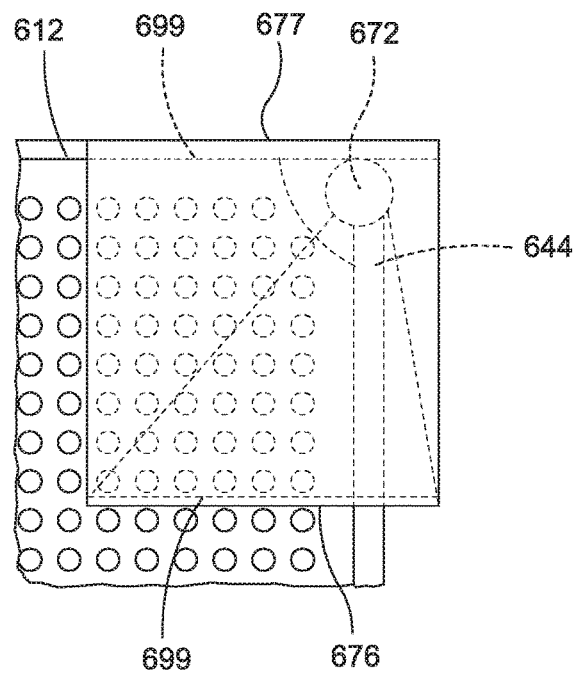
FIG. 6D shows a detail top view of the funnel of the system of FIG. 6A.

As can best be seen in the detail view of FIGS. 6A and 6D, the drain opening 672 aligns with the truncated corner 644 described above, and liquid passing through the drain opening passes through the space between the truncated corner of the insert and the shell 612, and in to a liquid capture reservoir 634. Two side walls 676, 677 connect side edges 699 of the arcuate wall to the side edges 621 of the drain surface 690. The side walls and the arcuate wall have outside dimensions less than an inside dimension of the corresponding opening of the bin. With this structure, the funnel may be removed from the shell for cleaning, maintenance, or any reason without requiring disassembly of the bin or insert.

Figure 7A:
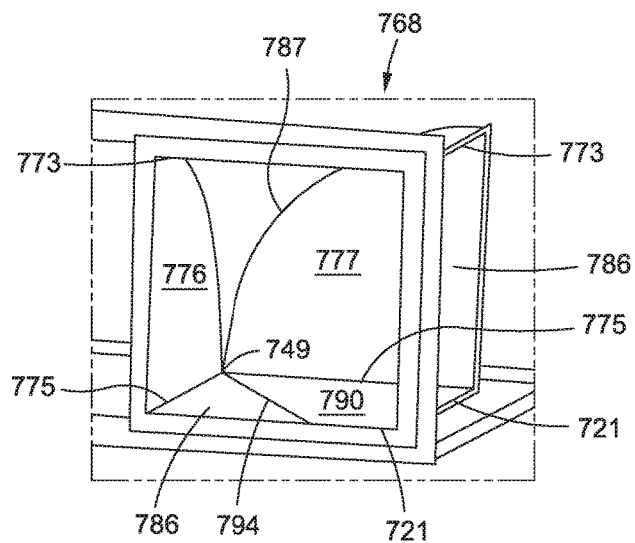
FIG. 7A shows a perspective view of an alternate funnel of the system of FIG. 6A.
Figure 7B:
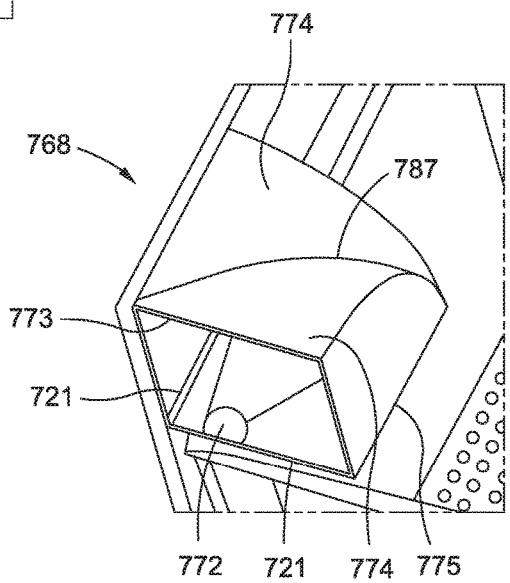
FIG. 7B shows an alternate perspective view of the funnel of FIG. 7A.
Figure 7C:
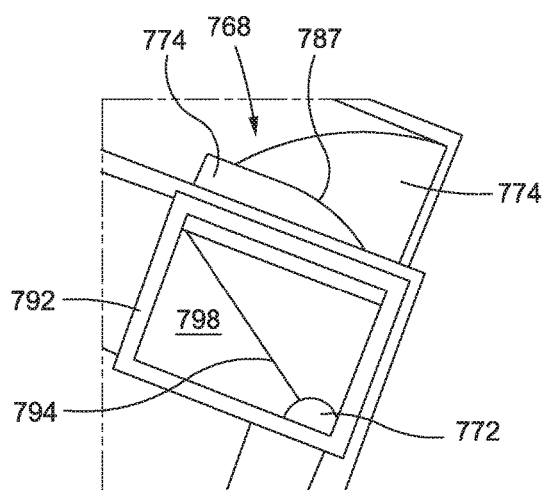
FIG. 7C shows yet another perspective view of the funnel of FIG. 7A.

FIGS. 7A, 7B, and 7C show a similar embodiment to that of FIGS. 6A-6D, but a funnel 768 has a second opening 786 proximal to a user (not shown). To create the openings, the side walls 776, 777 are placed on the sides of the drain surface 790 with an apex 749 opposite the drain opening 772. Two arcuate cover surfaces 774 have an opening edge 773 corresponding to two exterior edges 721 of the drain surface. From these edges, the arcuate cover surfaces curve downward toward an edge 775 of the drain surface opposite that of the exterior edge 721 of the drain surface 790. Because the two arcuate cover surfaces have their opening edges on adjoining sides, the two arcuate cover surfaces meet along a diagonal 787. The diagonal where the two arcuate cover surfaces meet corresponds to a diagonal of the drain surface 794. Similar to the embodiment of FIGS. 6A-6D, the embodiment of FIGS. 7A-7C has a flange 792 around one of the two openings. Also similar to the embodiment of FIGS. 6A-6D, the outside dimensions of the side walls and two arcuate cover surfaces are smaller than an inside dimension of an opening on a bin. With this structure, the funnel can be removed without disassembly of the bin or insert.

Figure 8A:
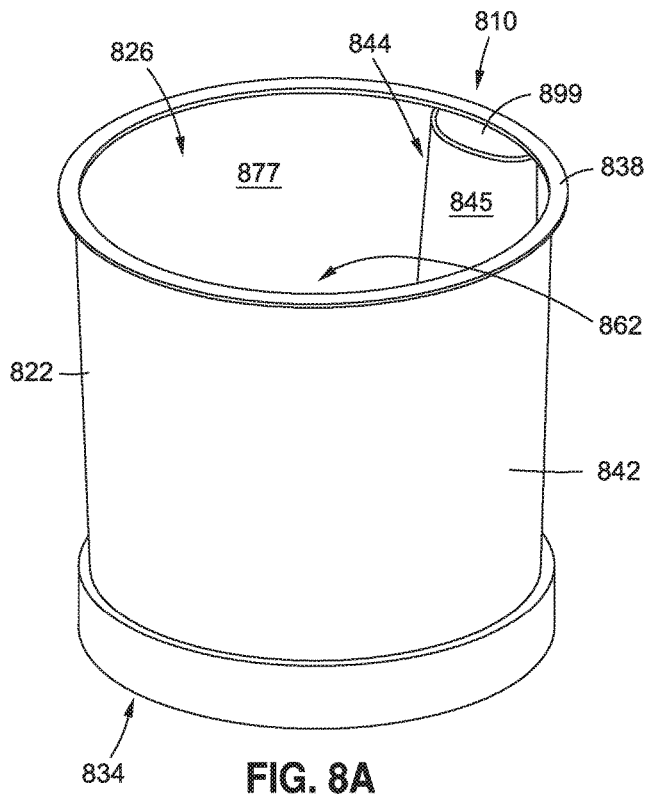
FIG. 8A shows an alternative embodiment of the system with a two piece insert.
Figure 8B:
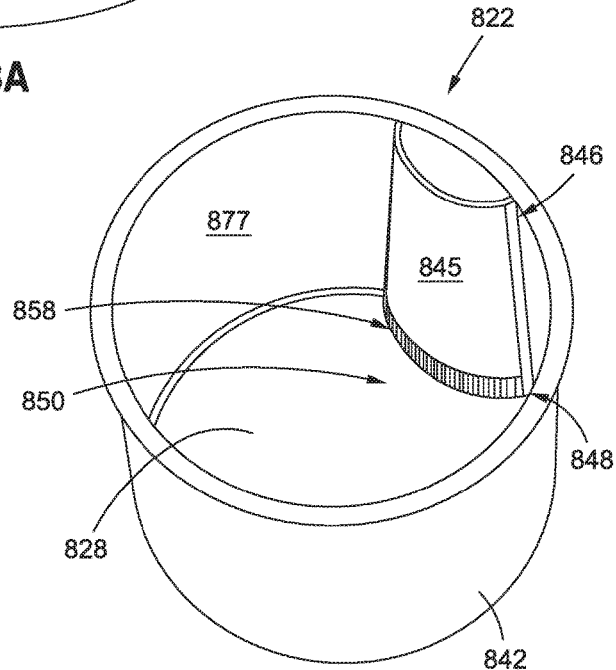
FIG. 8B shows a perspective view of the first piece of the embodiment of FIG. 8A.

FIGS. 8A, 8B, 8C, and 8D show yet another alternative embodiment of the disclosure. In this embodiment, the insert 822 is similar to that of previous embodiments, but a liquid capture reservoir 834 is integrated with the insert, creating a two piece sub-assembly 810. The first insert piece, also simply called the insert has a flange 838 at least partly surrounding a circumference of an open top end 826 of the insert, which in this embodiment performs a spacing and alignment function only. As is best seen in FIGS. 8A and 8B, the insert has a chute 844 formed on an interior 862 of the insert. In this embodiment the chute is formed from a single arcuate wall 845 extending from and returning to an interior surface 877 of a cylindrical wall 842 of the insert, and the corresponding portion 899 of the cylindrical wall of the insert. The arcuate wall flares slightly from a first end 846 corresponding to a top end of the insert to a second end 848, which corresponds to an open bottom end 828 of the insert. At the second end, the arcuate wall has a portion permeable to liquid 850 defined by a plurality of vertical slits 858. Fluid entering an interior of the insert and passing to the open bottom end of the insert is directed to the portion permeable to liquid defined by the vertical slits to the second end of the chute. The fluid may be directed, for example, by one of the tapers described above which is formed in a top of the second piece of the insert. In other embodiments, the chute wall may comprise three walls, each perpendicular to the next, or may be two walls meeting at an apex, or may take any shape which directs fluid from the first end to the second end in the desired manner.

In operation, the chute 844 is similar to the longitudinal groove of other embodiments in that the chute directs the flow of liquid poured in to a funnel (not shown) at a first end 346 of the chute to a second end 348 of the chute, where the liquid enters a second piece of the insert, also called a liquid capture reservoir 834, the chute thus defining a liquid pathway.

Figure 8C:
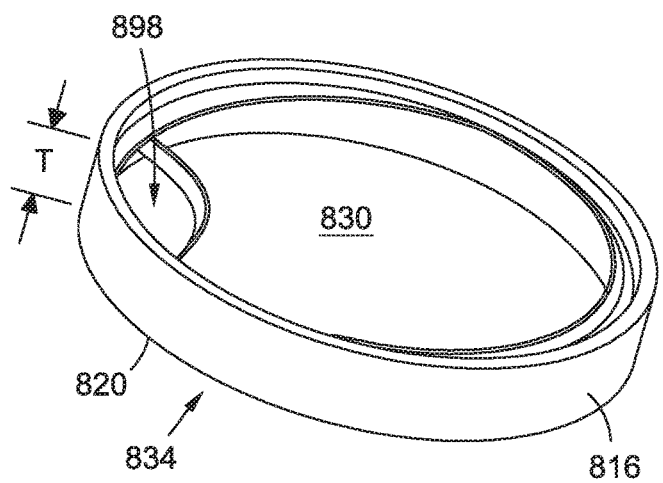
FIG. 8C shows a perspective view of the second piece of the embodiment of FIG. 8A.
Figure 8D:
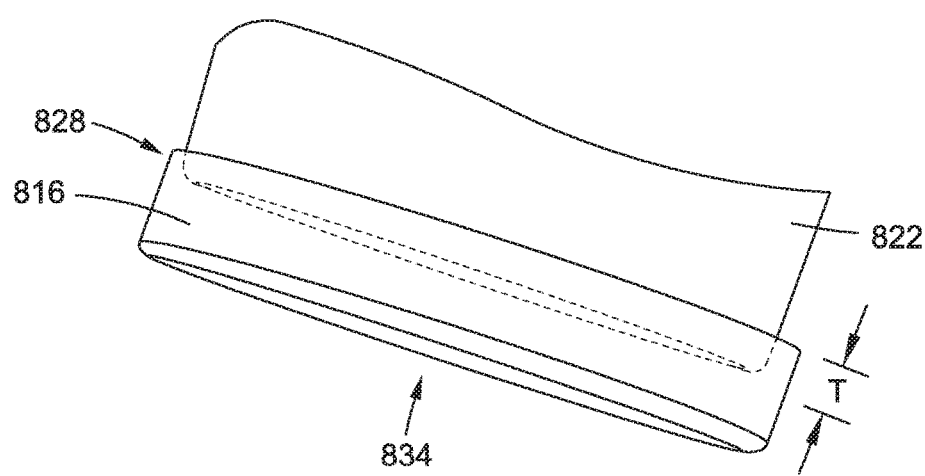
Figure 9A:
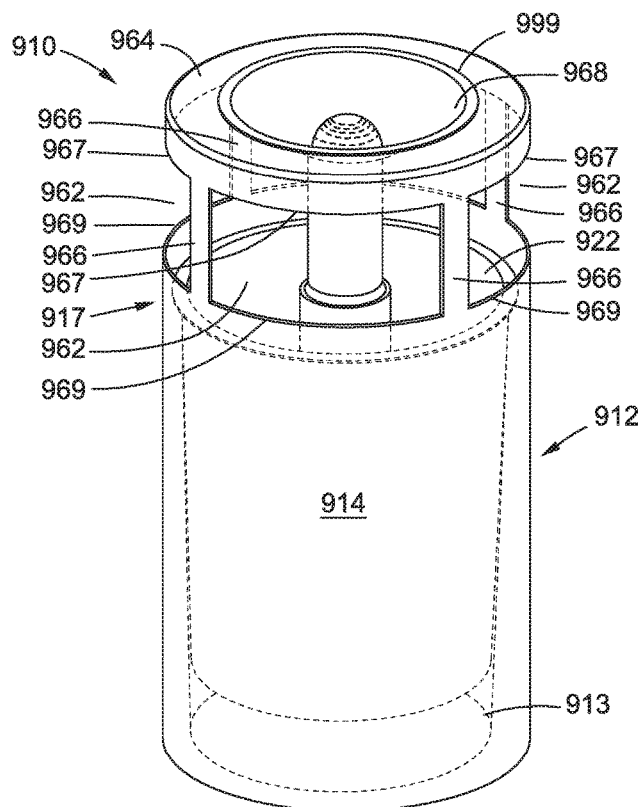
FIG. 9A shows a perspective view of an embodiment of the system with a center funnel.
Figure 9B:
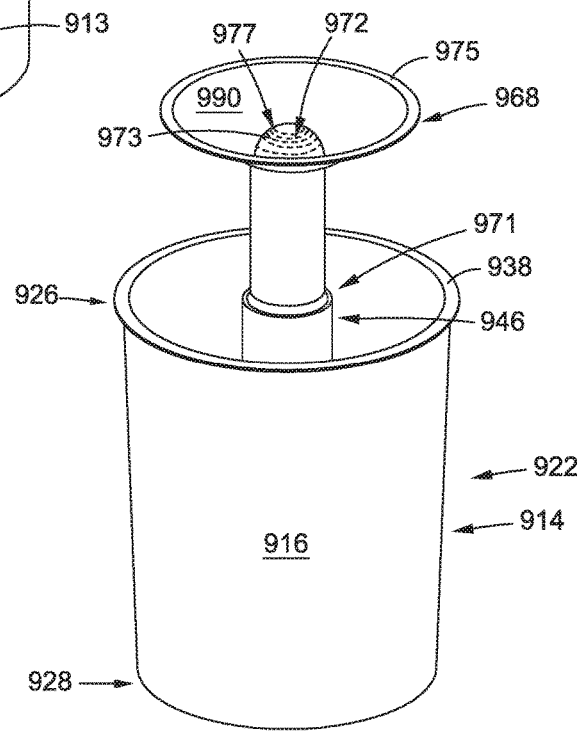
FIG. 9B shows a perspective view of the insert and funnel of the embodiment of FIG. 9A.
Figure 9C:
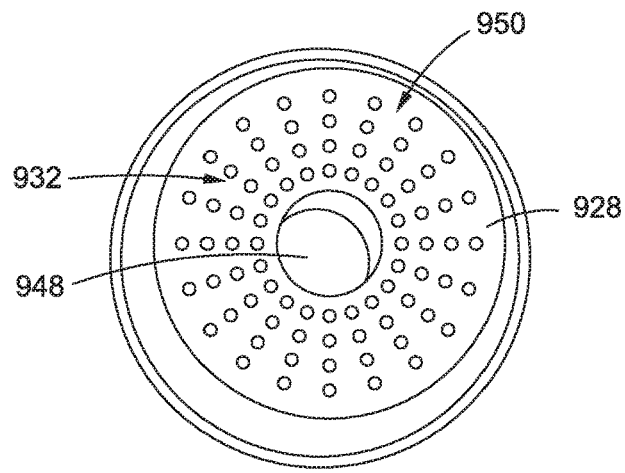
FIG. 9C shows a perspective of the of the bottom of the insert of the embodiment of FIG. 9A.
Figure 9D:
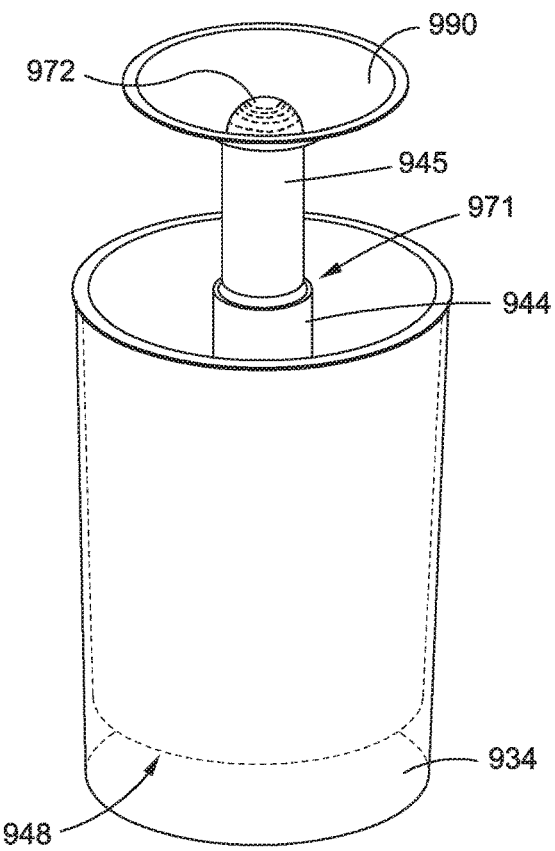
FIG. 9D shows a perspective view of the insert, shell, and funnel of the embodiment of FIG. 9A.

As can best be seen in FIGS. 8B, 8C, and 8D, liquid passing through the opening corresponding to the second end 848 of the chute 844 passes through a corresponding opening 898 in the liquid capture reservoir 834. The liquid capture reservoir includes a closed end 820 with a circumference larger than the circumference of the bottom end 828 of the insert 822. The circumference of the closed end of the liquid capture reservoir is larger than the circumference of the bottom end of the insert by the thickness of a wall 816. The wall extends above a top 830 of the liquid capture reservoir by an amount corresponding to a taper "T" of the top plus some additional constant amount. The wall extends below to connect to the closed end 820 of the liquid capture reservoir. In other embodiments, the closed end circumference may be the same as that of the insert, and the liquid capture reservoir has no wall.

As can best be seen in FIGS. 8C and 8D, the configuration of the top 830 and the wall 816 allows the liquid capture reservoir 834 to interface with the first piece 822, which has an open bottom end 828. In this embodiment, the wall 816 acts only to align the insert 822, which rests on top of the liquid capture reservoir 834. In other embodiments, the first and second pieces 822, 834 may be connected. The connected first and second pieces of the insert may be placed inside a shell collectively. They may be removed collectively as well, and separated to dispose of the liquid and solid waste. In some embodiments the first and second insert pieces are held together by a friction fit between the pieces, and in other embodiments, they are held together by a detent engagement.

FIGS. 9A, 9B, 9C, and 9D show yet another alternative embodiment of the system 910. Similar to other embodiments, the embodiment of FIGS. 9A, 9B, 9C, and 9D has an outer bin 912, an inner shell 913, an insert 922, and a funnel 968. The insert shown includes a body 914 defined by a cylindrical wall 916, a flange 938 on an open end 926, and a partially closed end 928 which includes a portion permeable to liquid 950. In other embodiments, the insert 922 may be of any shape in order to conform to differently shaped shells and bins. In this embodiment, the partially closed end 928 is flat. In other embodiments, the partially closed end 928 may be convex, concave, or tapered. In this embodiment, the portion permeable to liquid 950 is defined by holes 932, similar to the embodiment of FIGS. 1 and 2 or FIG. 6. In other embodiments, the portion permeable to liquid 950 may have a different shape or arrangement, such as one or a plurality of vertical slits, or one or a plurality of horizontal slits, or be a different material from the remainder of the insert, such as any shape of a gauze material, or a sponge, or a filter material, which prevents the passage of solids, but is permeable to liquids.

Similar to other embodiments, the bin 912 includes openings 962 which are separated by legs 966. The legs define a vertical height of the openings. Top edges 967 of the openings are defined by a bin top 964, and a bottom edge 969 of the openings is defined by an open end 917 of the bin body 914.

This embodiment further includes an opening 999 in the top, an interior circumference of which supports a funnel 968. In this embodiment, the funnel has a circular cross section along a longitudinal axis. A drain surface 990 tapers from a collar 975 at an outer circumference of the funnel to a drain opening 972 in the center of the funnel. The drain opening includes a cover 973, convex in shape, which includes a plurality of openings 977 which allow any liquid to enter the drain opening. In other embodiments, the cover 973 may be flat, or concave, or any other shape which allows liquid to enter the drain opening with a sufficient flow rate. The drain opening directs liquid in to a funnel drain column 645, which extends longitudinally past the openings 962 in the bin 912 to a center of the insert 922. Near an open end 926 of the insert, the funnel drain column connects to a corresponding insert drain column 944. In this embodiment, an open end 971 of the funnel drain column abuts a first end 946 of the insert drain column. In other embodiments, an outside circumference of the funnel drain column is smaller than an inner circumference of the insert drain column, and the funnel drain column extends, at least partly in to the insert drain column. In other embodiments, the ends of the drain columns may have corresponding tapered concave and convex edges, which serve to create a better seal, and better align the drain columns. In still other embodiments, the open end of the funnel drain column and the first end of the insert drain column may feature a twist and lock connection, where at least one slot with two different portions, one with a wider dimension, and a second with a narrower dimension interfaces with a "T" shaped element. The horizontal portion of the "T" shaped element enters the wider dimension portion of the slot, and then is rotated to the narrower dimension portion, an inner dimension of which is less than an outer dimension of the horizontal portion of the "T" shaped element. The narrow dimension portion also includes a detent element which interacts with the "T" shaped element to prevent accidental rotation of the "T" shaped portion and the slot relative to one another.

The insert drain column 944 defines a fluid pathway and includes a second end 948 which opens to a liquid capture reservoir 934. In this embodiment the drain columns 944, 945 have a circular cross section along the longitudinal axis. In other embodiments, the drain columns may have a square, rectangle, triangle, or other cross section, either for aesthetic reasons, for example, to match the longitudinal cross section of the bin, shell, or insert, or for functional reasons, for example, to allow faster drainage of liquid.

Thus, liquid poured on to the funnel drain surface 990 moves down and across the surface to the drain opening 972 and through the drain opening to the funnel drain column 945, down through the funnel drain column and past the open end 971 of the funnel drain column and in to the insert drain column 944 and out the second end 948 of the insert drain column and in to the liquid capture reservoir 934. In this way, the funnel and the insert drain column combine to form a liquid pathway which is coaxial with a longitudinal axis of the system.

Figure 10:
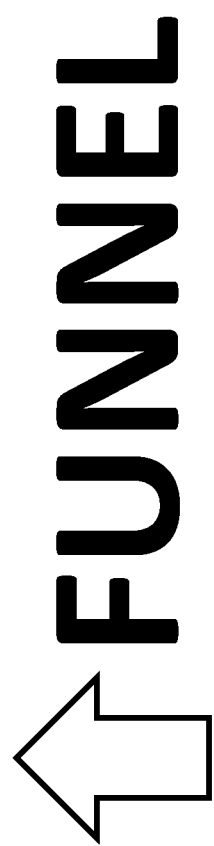
FIG. 10 shows a view of a marking used as an indicator.

Any of the above embodiments which have a funnel and an insert may have an indicator, one exemplary embodiment of which is shown in FIG. 10, which provides a user indication of the alignment of the funnel and the insert during assembly. The indicator may comprise a marking 1010 such as a word funnel and an arrow, or the word may be superimposed over the arrow, or could be any graphic which would indicate to a user proper alignment between the two. In other embodiments, the indicator may also be a structure, such as a raised boss or rail which indicates alignment to a corresponding structure on the shell, or the funnel itself, to make sure that the inert is properly aligned after the insert has been removed by the user to clear solid waste, for cleaning, or for any other purpose.

The above description is given by way of example, and not limitation. Given the above disclosure, one skilled in the art could devise variations that are within the scope and spirit of the invention disclosed herein, including various ways of forming the drain surface. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of forming a system for separation of solid and liquid waste, comprising:
    Forming a shell comprising a cylindrical wall, an open end, and a closed end;
    Placing an insert removably and at least partially within the shell, the insert comprising:
        A body;
        A first open end on one end of the insert;
        A liquid pathway defined by a longitudinal groove extending from the first open end of the insert to an opposite, partially closed end of the insert; and
        A flange extending at least partially around a perimeter of the open end, at least a portion of the flange having an outer diameter greater than an outer diameter of the shell; and
    Forming a funnel comprising at least one drain opening which directs fluids in to the liquid pathway;
    Wherein the partially closed end of the insert comprises a portion permeable to liquid to which a flow of liquid is directed by a remainder of the partially closed end and the cylindrical wall.

2. The method of claim 1, wherein the portion permeable to liquid is a plurality of vertical slots arranged around the perimeter of a raised panel, the vertical slots and the raised panel extending in to an interior of the insert.

3. The method of claim 1, wherein the portion permeable to liquid is a fabric.

4. The method of claim 1, wherein the insert defines a length shorter than a length of the shell.

5. The method of claim 2, wherein at least one of the plurality of vertical slots extends through an outer surface of the body.

6. The method of claim 1, wherein the body is substantially cylindrical.

7. A system for separation of solid and liquid waste, the system comprising:
    a shell comprising a body, an open end, and closed end;
    an insert removably placed at least partially within the shell, the insert comprising a body, an open end, a longitudinal groove extending between the open end of the insert and an opposite, partially closed end of the insert, and a flange extending at least partially around a perimeter of the open end, at least a portion of the flange having an outer diameter greater than an outer diameter of the shell; and a funnel comprising a bottom portion, the bottom portion comprising a drain opening, the drain opening directing fluids in to the longitudinal groove.

8. The system of claim 7, wherein the bottom portion is an elliptical paraboloid.

9. The system of claim 7, wherein the funnel further comprises a wall distal of a user.

10. The system of claim 9, wherein the wall distal of a user is a laterally arcuate wall.

11. The system of claim 7, wherein the insert further comprises a partially closed end, the partially closed end comprising a surface comprising a portion permeable to liquid to which a flow of liquid is directed by a remainder of the surface.

12. A system for separation of solid and liquid waste, comprising:
a shell comprising a body, an open end, and closed end;
an insert removably placed at least partially within the shell, the insert comprising a body, an open end, a longitudinal groove extending from the open end of the insert to an opposite, partially open end of the insert, and a flange extending at least partially around a perimeter of the open end, at least part of the flange having an outer diameter greater than an outer diameter of the shell; and a convex bottom portion, a portion permeable to liquid comprising at least one opening around the perimeter of the convex bottom portion, the at least one opening directing fluids in to a liquid capture reservoir; and
a funnel comprising a drain opening directing fluids in to the liquid capture reservoir.

13. The system of claim 12, wherein the portion permeable to liquid comprises a plurality of openings on the convex bottom portion.

14. The system of claim 12, wherein the funnel further comprises at least one tiered portion located between the bottom portion and the vertical flange.

15. The system of claim 12, wherein the funnel abuts the longitudinal groove of the insert.

16. The system of claim 12, wherein the funnel further comprises a wall distal of a user.

17. The system of claim 16, wherein the wall distal of a user is a laterally arcuate wall.

18. The system of claim 12, where in the funnel further comprises a vertical flange proximal to a user.

19. The system of claim 7, wherein the funnel further comprises a wall covering the bottom portion, the wall sloping from a point higher proximal to a user to a point adjoining the bottom portion distal of the user.

* * * * *